United States Patent
Bi et al.

(10) Patent No.: US 8,813,108 B2
(45) Date of Patent: Aug. 19, 2014

(54) APPARATUS AND METHOD FOR PROVIDING PREFERRED MEDIA PROGRAMMING

(75) Inventors: Haifeng Bi, San Antontio, TX (US); Xiaolian Bi, San Antontio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/303,984

(22) Filed: Nov. 23, 2011

(65) Prior Publication Data

US 2013/0133022 A1 May 23, 2013

(51) Int. Cl.
*H04N 7/16* (2011.01)
*H04N 21/443* (2011.01)

(52) U.S. Cl.
CPC .................................. *H04N 21/4432* (2013.01)
USPC ................................................ 725/10; 725/13

(58) Field of Classification Search
CPC ....................... H04N 21/4828; H04N 21/4432
USPC ...................................................... 725/10, 13
See application file for complete search history.

(56) References Cited

U.S. PATENT DOCUMENTS

| | | | |
|---|---|---|---|
| 6,359,661 B1 | 3/2002 | Nickum | |
| 6,490,724 B1* | 12/2002 | Ha et al. | 725/9 |
| 2002/0059588 A1 | 5/2002 | Huber et al. | |
| 2003/0084446 A1* | 5/2003 | Thurston et al. | 725/44 |
| 2003/0093815 A1* | 5/2003 | Morrison | 725/140 |
| 2003/0135539 A1* | 7/2003 | Kondo et al. | 709/201 |
| 2006/0242665 A1* | 10/2006 | Knee et al. | 725/38 |
| 2008/0060012 A1* | 3/2008 | Rydenhag | 725/46 |
| 2009/0138907 A1* | 5/2009 | Wiser et al. | 725/34 |
| 2009/0244402 A1 | 10/2009 | Rye | |
| 2010/0218214 A1 | 8/2010 | Fan | |
| 2011/0225609 A1* | 9/2011 | Li et al. | 725/38 |
| 2012/0174141 A1* | 7/2012 | Ergen et al. | 725/1 |
| 2012/0260287 A1* | 10/2012 | Yeh et al. | 725/39 |

* cited by examiner

*Primary Examiner* — Junior Mendoza
(74) *Attorney, Agent, or Firm* — Guntin & Gust, PLC; Joseph P. Hrutka (57) ABSTRACT

A system that incorporates teachings of the present disclosure may include, for example, identifying a first user initiating control of a media processor device, determining a startup media program according to one or more startup media preferences associated with the identified first user and one or more characteristics corresponding to the first user initiating control, and transmitting to a display device the startup media program derived from a media stream. Other embodiments are disclosed.

20 Claims, 8 Drawing Sheets

APPARATUS AND METHOD FOR PROVIDING PREFERRED MEDIA PROGRAMMING

FIELD OF THE DISCLOSURE

The present disclosure relates generally to an apparatus and method for providing preferred media programming.

BACKGROUND

Media programming is typically delivered to consumers by service providers. Often, media processing equipment, such as set-top boxes, is used to ensure that media programming delivered to a consumer's premises is accessible only for authorized users. The delivered media programming is frequently experienced by consumers using media display devices, such as televisions. Consumers frequently share media processing equipment and display devices between multiple users living at common premises. Individual consumers at common premises can desire very different entertainment and information experiences when interacting with the available media programming. Modern communication networks benefit from interconnectivity between consumers and media processing and display devices. As network capabilities expand, these interconnections provide new opportunities to enhance abilities to enjoy media programming.

DETAILED DESCRIPTION

The present disclosure describes, among other things, illustrative embodiments for providing media preferred programming. In one embodiment, a media processor device can be operable to provide a startup channel or media programming at a display device according to preferences for a user who has started or initiated control of the media processor device. Other embodiments are contemplated by the present disclosure.

One embodiment of the present disclosure includes a mobile communication device having a memory coupled to a processor. The memory includes computer instructions that, when executed by the processor, can configure the processor to be operable to detect a startup event. The processor can also be operable to receive at a user interface of the media processor device an input identifying a first user responsive to the detected startup event. The processor can further be operable to access a list of user profiles. Each user profile of the plurality of user profiles can include one or more startup channel preferences associated with one user of the media processor device. The processor can be operable to compare the identified first user to at least a portion of the list of user profiles to retrieve the one or more startup channel preferences associated with the first user. The processor can also be operable to determine a startup channel according to the one or more startup channel preferences and one or more characteristics of the startup event. The processor can further be operable to decode a media program from a media stream corresponding to the determined startup channel. The processor can further be operable to present the decoded media program at a media device communicatively coupled to the media processor device.

One embodiment of the present disclosure includes a computer-readable storage medium including computer instructions, which, when executed by a processor, can cause the processor to receive at a user interface of a media processor device an input indicating initiation of control by a first user of the media processor device. The computer instructions can also cause the processor to compare the first user to at least a portion of a list of user profiles to retrieve one or more startup media preferences associated with the first user. The computer instructions can further cause the processor to determine a startup media program according to the one or more startup media preferences and one or more characteristics corresponding to the initiation of control by the first user. The computer instructions can cause the processor to decode the startup media program from a media stream. In turn, the computer instructions can also cause the processor to present the decoded startup media program at a display communicatively coupled to the media processor device.

One embodiment of the present disclosure includes a method including identifying a first user initiating control of a media processor device. The method can also include determining a startup media program according to one or more startup media preferences associated with the identified first user and one or more characteristics corresponding to the first user initiating control. The method can further include transmitting to a display device the startup media program derived from a media stream.

Figure 1:
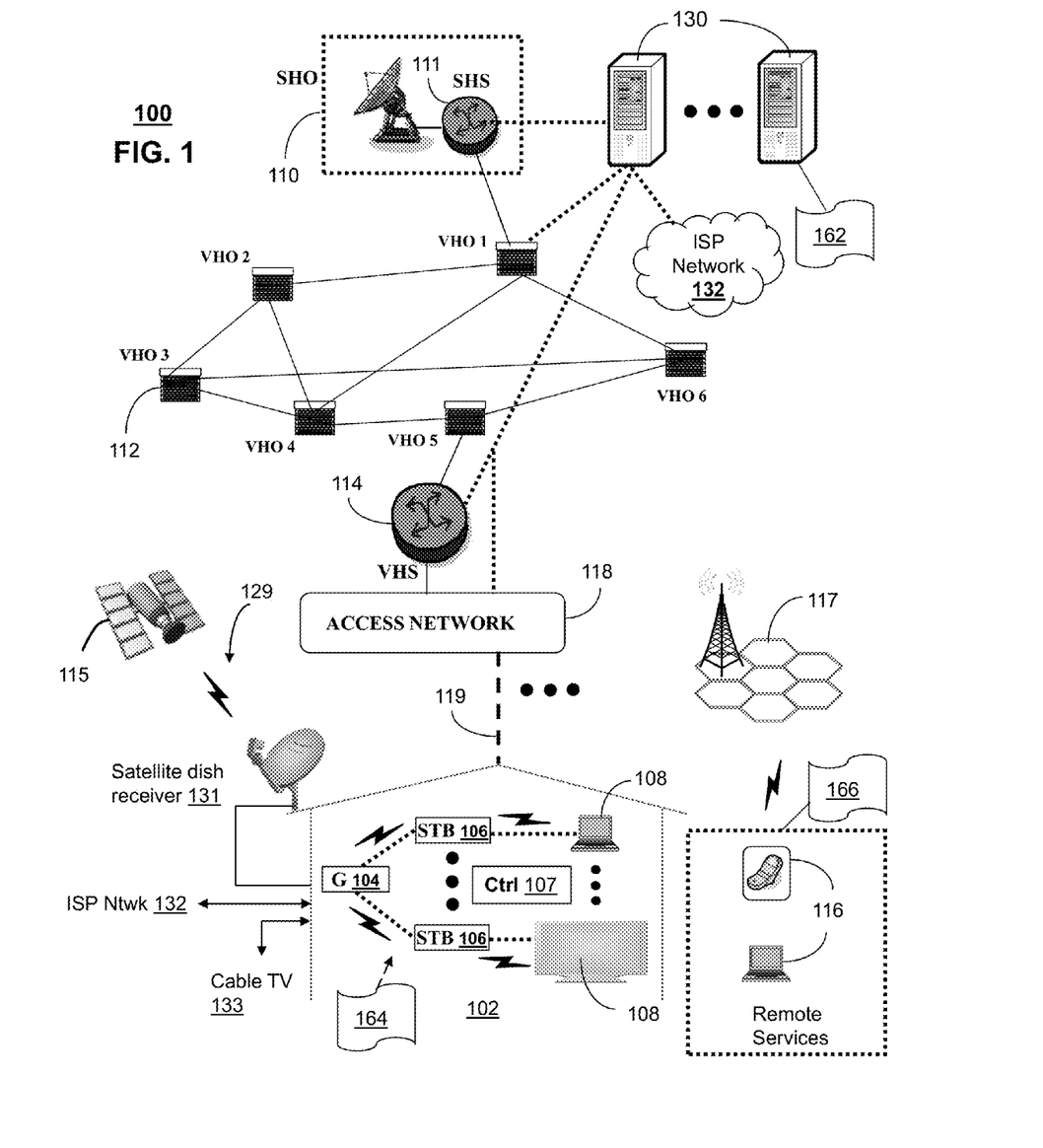
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or mobile communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media server device 130. The media server device 130 can use common computing and communication technology to perform function 162, which includes among things, providing preferred media content to a media device 108 by way of a media processor device 106. The media processor device 106 can store a list of user profiles, where each user profile can include one or more startup channels or startup media programs associated with a user. The media processor device 106 can detect a startup event or detect an initiation of control of the media processor device 106 by a user. The media processor device 106 can receive at a user interface of the media processor device 106 an input identifying the user responsive to a detected startup event or control initiation. The media processor 106 can access a list of user profiles and compare the identified user to the list of user profiles. The media processor device 106 can retrieve the one or more startup channel preferences associated with the user. The media processor device 106 can determine a startup channel or a startup media program according to the one or more startup channel preferences. The media processor device 106 can decode a media program from a media stream corresponding to the determined startup channel or startup media program. The media processor device 106 can present the decoded media program at a media device 108 communicatively coupled to the media processor device 106.

Figure 2:
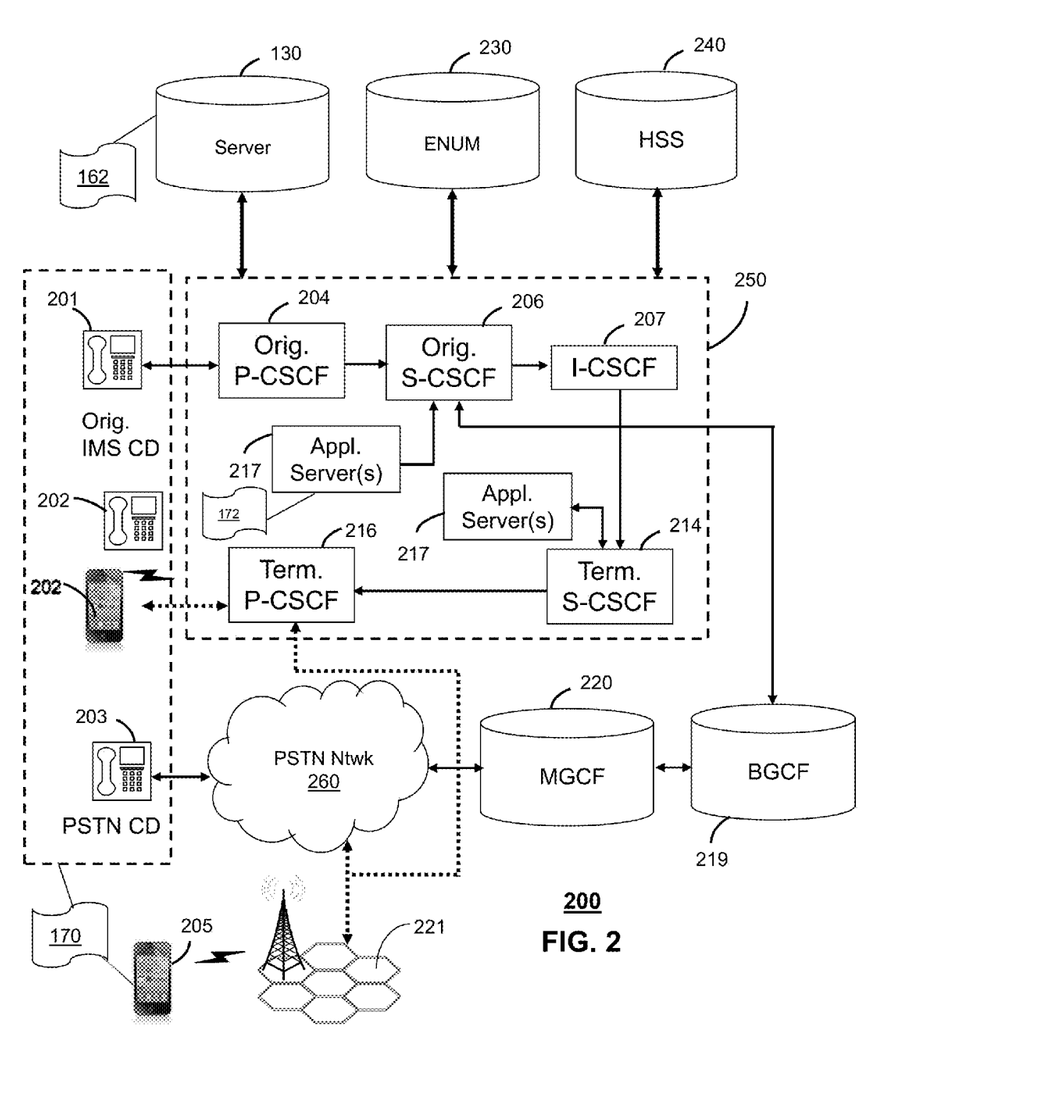

FIG. 2 depicts an illustrative embodiment of a communication system 200 employing Internet Protocol Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, caller ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

Communication system 200 can include or otherwise be coupled to the media server device 130 of FIG. 1 for purposes similar to those described above. The communication system 200 can include or otherwise be coupled to a mobile communication device 116 and/or a media processor 108 of FIG. 1 for purposes similar to those described above. It is further contemplated by the present disclosure that the media server device 130 and/or the media processor device 108 and/or the media controller device 107 can perform the function 162 and thereby provide preferred media programmers for subscribers associated with CDs 201, 202, 203, and 205. CDs 201, 202, 203, and 205 can be adapted with software to perform function 170 to utilize and integrate with the media content application performed by the media server device 130 and/or the media processor device 108 and/or the media controller device 107. It is further contemplated that the media server device 130 can be an integral part of the application server(s) 217, where the application server(s) 217 performs function 172, which can be substantially similar to function 162 and adapted to the operation of the IMS network 250.

Figure 3:
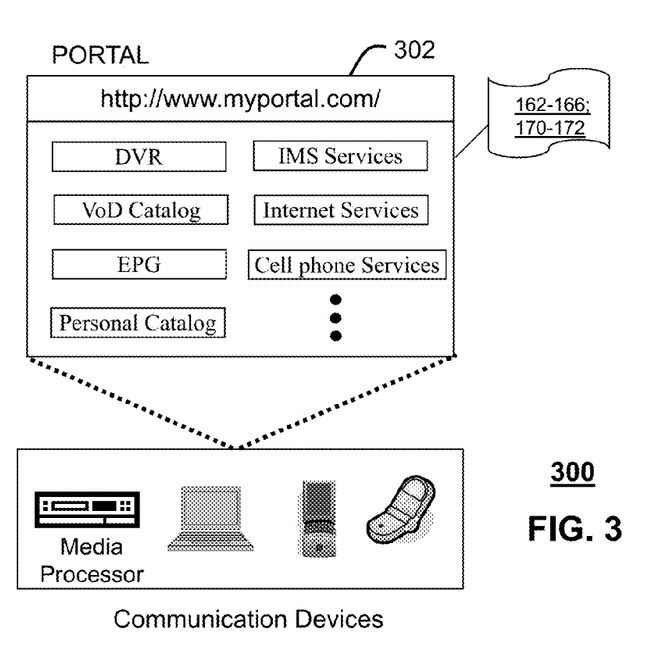
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications for functions 162, 170, and 172 of the devices of FIGS. 1-2, respectively, as described earlier.

Figure 4:
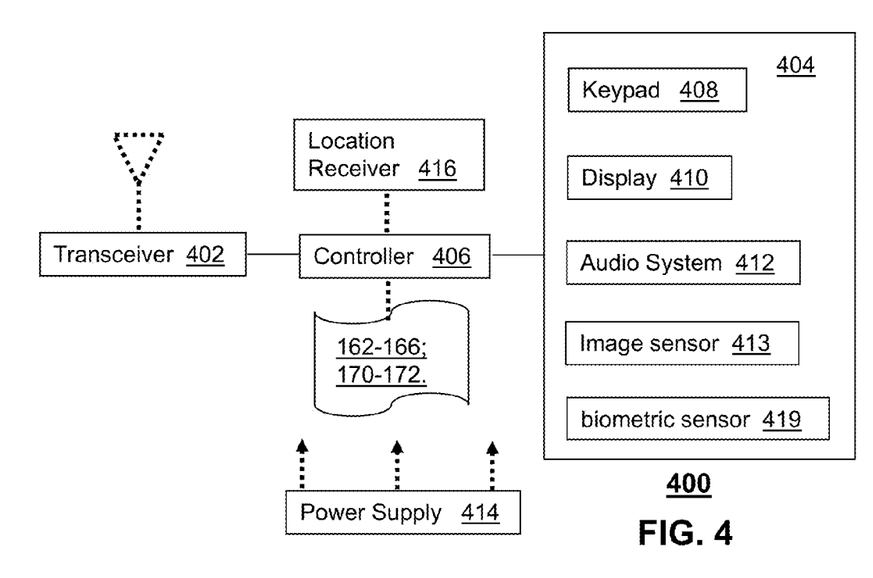
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support wireless high-definition multimedia interface (HDMI). The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface, such as a universal serial bus (USB) cable or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features. The communication device 400 can include a biometric sensor 419 and supporting circuitry. The biometric sensor 419 can capture a biometric reading from a user of the communication device 400. For example, the biometric sensor 419 can capture a finger print of the user to provide an identification of a particular user of a list of known users.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The communication device 400 can use captured voice data from a user to provide an identification of a particular user of the communication device 400 from among several known users. The UI 404 can further include an image sensor 413 such as a charged coupled device (CCD) camera for capturing still or moving images. The communication device 400 can capture an image of a user and use the captured image to provide an identification of a particular user of the communication device 400 from among several known users.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The communication device 400 can use the transceiver 402 to detect the presence of a device by radio frequency identification (RFID). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor device 106, the media controller device 107, the media devices 108, or the mobile communication devices 116 of FIG. 1, as well as the IMS CDs 201-202 and PSTN CDs 203-206 of FIG. 2. It will be appreciated that the communication device 400 can also represent other common devices that can operate in communication systems 100-200 of FIGS. 1-2 such as a gaming console and a media player.

Figure 5:
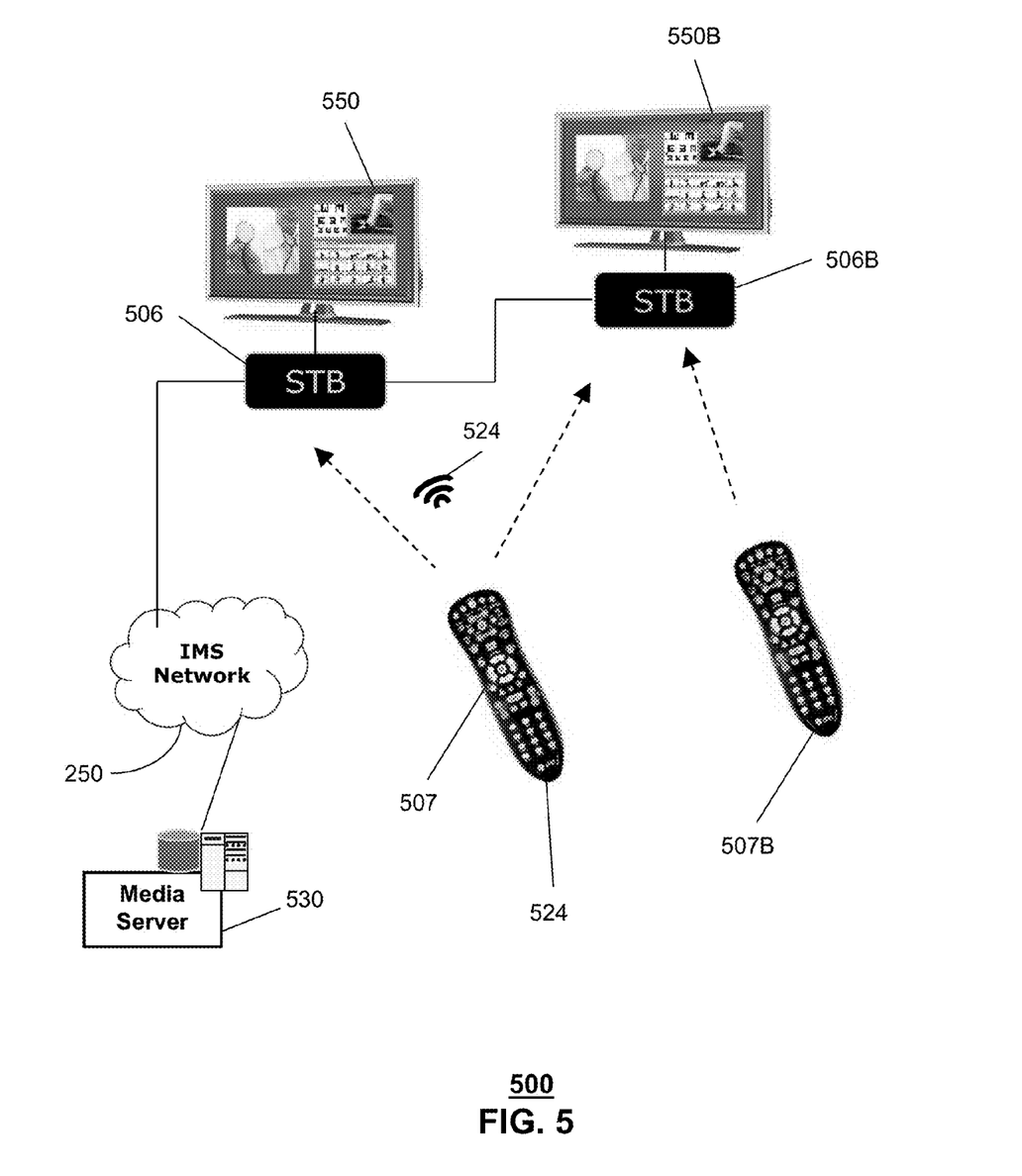
FIG. 5 depicts an illustrative embodiment of a communication system.

FIG. 5 depicts an illustrative embodiment of a communication system 500 for providing media content. System 500 can be overlaid or operably coupled to communication systems 100-200 as another representative embodiment of communication systems 100-200. System 500 can include a media server device 530 in communication with a packet switched network such as IMS network 250. The media server device 530 can be in communication with a media processor device 506, such as set-top box, that can be in further communication with a media device 550, such as a television. The media server device 530 can provide media content, by way of a media stream, to the media processor device 506. The media processor device 506 can also be in further communication with one or more slave media processor devices 506B to form a local network of media processor devices 506 and 506B. The slave media processor device 506B can be coupled to another media device 550B. The slave media processor device 506B can receive media content streamed from the media server device 530 or media content stored on the media processor device 506.

A media controller 507, such as a remote controller device, can be used to control operations of the media processor device 506. Each media processor device 506 and 506B can be configured to be controlled by a particular media controller 507 and 507B, respectively. In one embodiment, a single media controller 507 can be configured to control multiple media processor device 506 and 506B. The media controller 507 can include user inputs 524 to enable the media controller to either detect an identity of a user of the media processor device 506 or to enable the media controller 507 to pass on to media processor device 506 data that can be used to identify the user. In one embodiment, the media controller 507 can identify a user by receiving a button push or a combination of button pushes uniquely assigned to the user. In one embodiment, the media controller 507 can capture biometric data from the user, such as a finger print, a visual image, or a voice sample, that can be used to identify the user by the media controller 507 or the media processor device 506. By identifying a user of the media processor 506, the system 500 can provide preferred media programming to the user upon detection of startup or user initiating of system control. The preferred media programming can be governed by a user profile. The media server device 530, media processor device 506, and media controller device 507 can thereby provide preferred media programming according to the illustrative embodiments of method 600 of FIG. 6.

Figure 6:
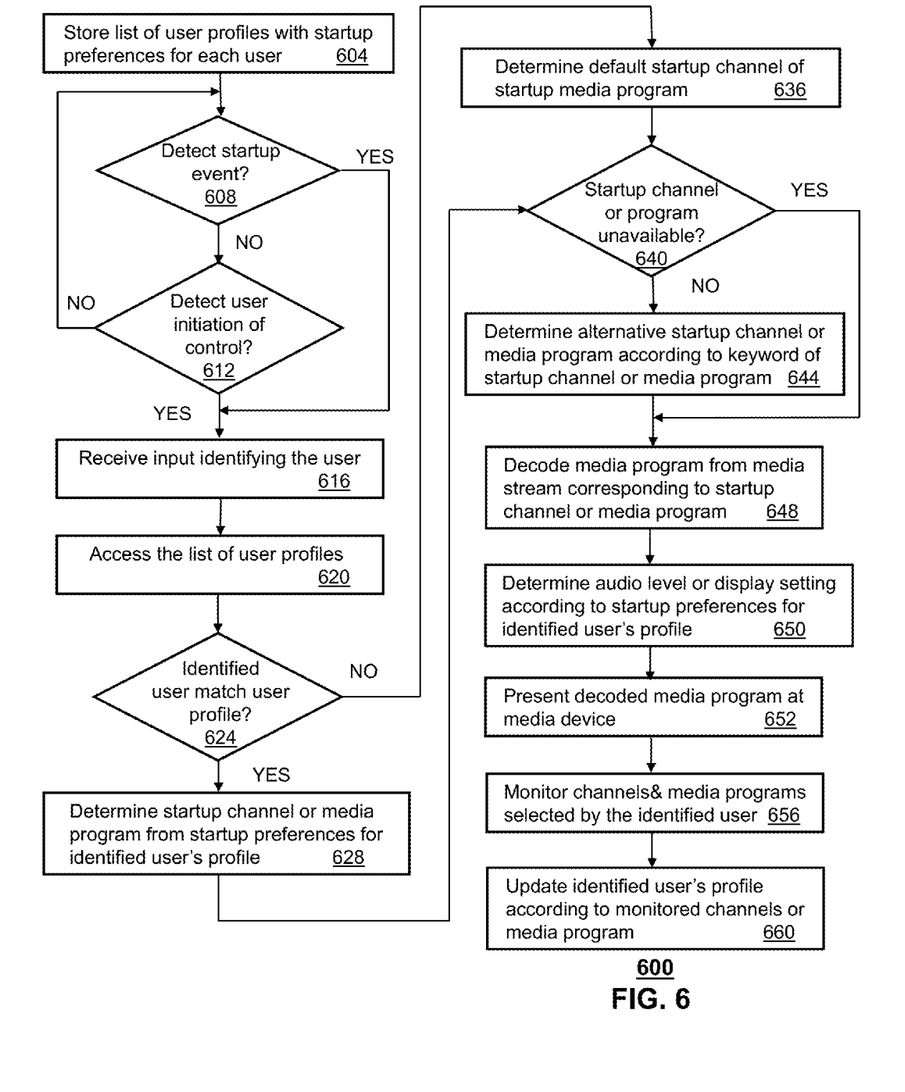
FIG. 6 depicts an illustrative embodiment of a method that can be used in portions of the communication systems described in FIGS. 1-5.

FIG. 6 depicts an illustrative method 600 that operates in portions of the devices of FIGS. 1-5. Method 600 can begin with step 604 in which a media processor device 506 stores a list of user profiles. Each user profile can be associated with a unique or different user of the media processor device 506. For example, if a customer premises has four different users of a media processor device 506, such as a set-top box used for decoding an incoming media stream from a media server device 530, then each of the four users can have a user profile stored at the list of user profiles. Each user profile can include startup preferences associated with that particular user. In one embodiment, the startup preferences can be used by the media processor device 506 to control how the media processor device 506 responds to a startup event. In one embodiment, the list of user profiles is accessed whenever the media processor device 506 experiences a startup event, such as powering ON or resetting the media processor device 506. In one embodiment, the list of user profiles is accessed whenever a user initiates control of the media processor device 506, such as when a first user had been using a media controller device 507 to control a media processor device 506 but now a second user has now assumed control over the media controller device 507. In the case of either a startup event or of a user initiation of control, the media processor device 506 can access the list of user profiles.

The media processor device 506 can determine if a startup event or an initiation of user control was caused by a user identified by one of the user profiles. For example, the media processor device 506 can receive an input from a user, provisionally identified as "User 2" at a media controller device 507, and can search the list of user preferences for entries associated with "User 2." If this user is identified to a user profile, then the media processor device 506 can use startup preferences in the user profile to govern how the media processor device 506 starts up. For example, the user profile can instruct the media processor device 506 to tune in a particular channel (e.g., CNN) anytime a first user powers up or initiates control of the media processor device 506. In another example, the user profile can instruct the media processor device 506 to select a particular media program (e.g., The Daily Show) anytime a second user powers up or initiates control of the media processor device 506.

The user profile can include a default channel for any power up or initiation of control. The user profile can include a default media program for any power up or initiation of control. The user profile can include an alternative default channel or alternative default media program in the event that the default channel or default media program is unavailable at the moment when the user causes the startup event or initiation of control. The user profile can include a list of channels and/or media programs where each is associated with a particular time or range of time during the day. For example, the user profile list can have a first startup entry where, if the time is between 6 am and 9 am, then the media processor device 506 is instructed to tune to a particular channel (e.g., ESPN). A second entry can instruct the media processor device 506 to tune in a particular media program if the time is between 4 pm and 9 pm (e.g., "That 70's Show"). The user profile can extend the time-based control to include days of the week or dates of the year. For example, the user profile can instruct the media processor device 506 to tune in a particular channel if the startup event occurs between 6 am and 9 am on Monday through Friday but not Saturday and Sunday. On Saturday and Sunday, for example, the user profile can allow the media processor device 506 to select a default channel instead.

In one embodiment, the user profile can store a most recently watched channel and/or a most recently watched media program and can make one of these available to the media processor device 506 as the startup channel or media program. In such a case, the media processor 506 can monitor viewing habits of the user to determine the most recently watched channel and/or media program. In one embodiment, the user profile can store a most frequently watched channel and/or a most frequently watched media program and can make one of these available to the media processor device 506 as the startup channel or media program. In such a case, the media processor 506 can monitor viewing habits of the user to determine the most watched channel and/or media program.

In one embodiment, the user profile can store a textual description of any startup channel and/or startup media program. The textual description of the startup channel and/or media program can be searched for keywords by the media processor device 506 in the event the startup channel or program is unavailable at the time of the startup event or initiation of control. The media processor 506 can use results of such a search to determine one or more alternative startup channels and/or media programs.

In one embodiment, the startup preferences of the user profile can include one or more startup settings for a media device 550 coupled to the media processor 506. The startup settings can be used to adjust the performance of the media device 550 to thereby accommodate preferences of the user. In one embodiment, the startup settings can include audio settings, such as volume, muting, closed-captioning, and/or surround sound parameters. For example, a user may desire a volume output of a media device 550, such as a television, always be set to a muted state or to a very low volume whenever the user powers up or initiates control of the device. In another example, a user may desire for a special surround sound parameter by enabled or disabled whenever that user accesses the media processor device 506. In one embodiment, the startup setting can include display settings, such as an aspect ratio or enabling a high definition television signal. For example, a user can configure a profile to enable only the high definition television channels at startup while disabling channels not broadcast in high-definition.

Figure 7:
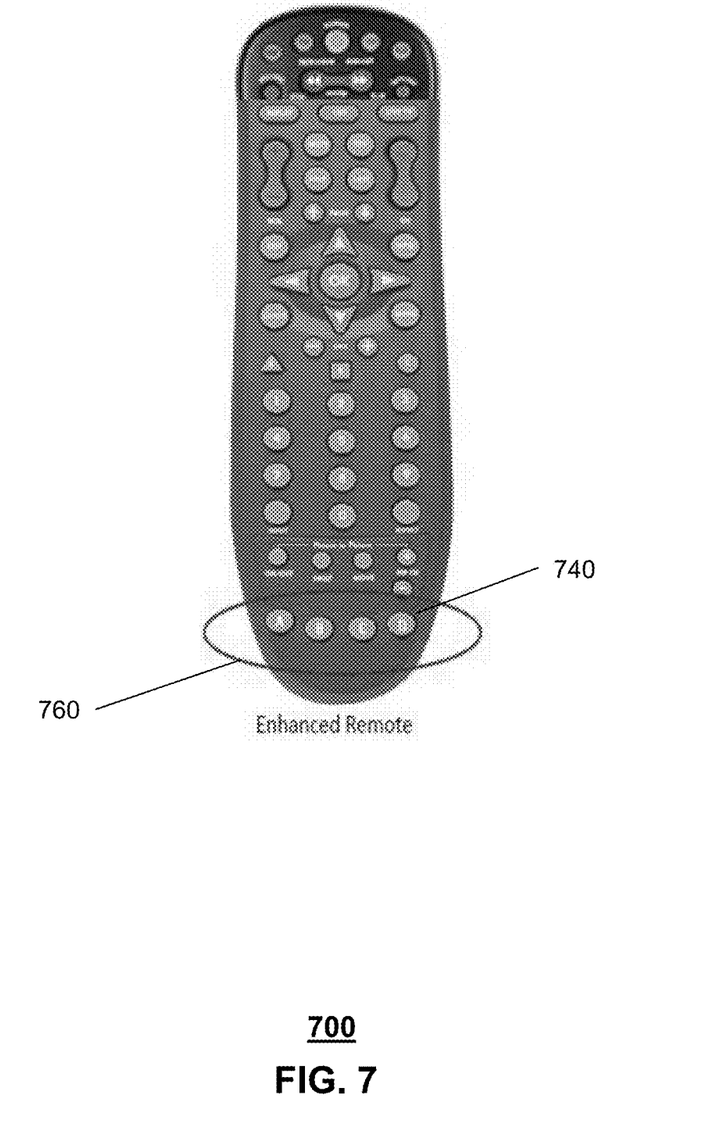
FIG. 7 depicts an illustrative embodiment of a media controller device that can be used in portions of the communication systems described in FIGS. 1-5 and in the method of described in FIG. 6.

Referring now to FIG. 7, an embodiment of a media controller device 700 is illustrated. In one or more embodiments, the medial controller device 700 includes a set 760 of user identification buttons 740. In one embodiment, a user of the media controller device 700 can identify himself or herself by selecting any one of the buttons 740 labeled "A", "B", "C", or "D". In one example, the user can combine two or more buttons for identification, such as "AC" or "CD."

Figure 8:
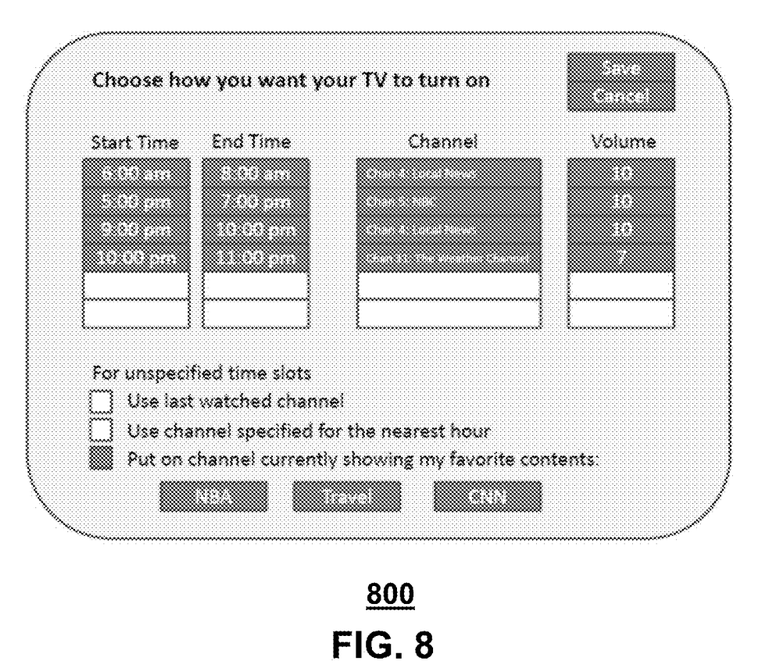
FIGS. 8-9 depict illustrative embodiments of graphical user interfaces that can be used in portions of the communication systems described in FIGS. 1-5 and 7 and in the method of described in FIG. 6.
Figure 9:
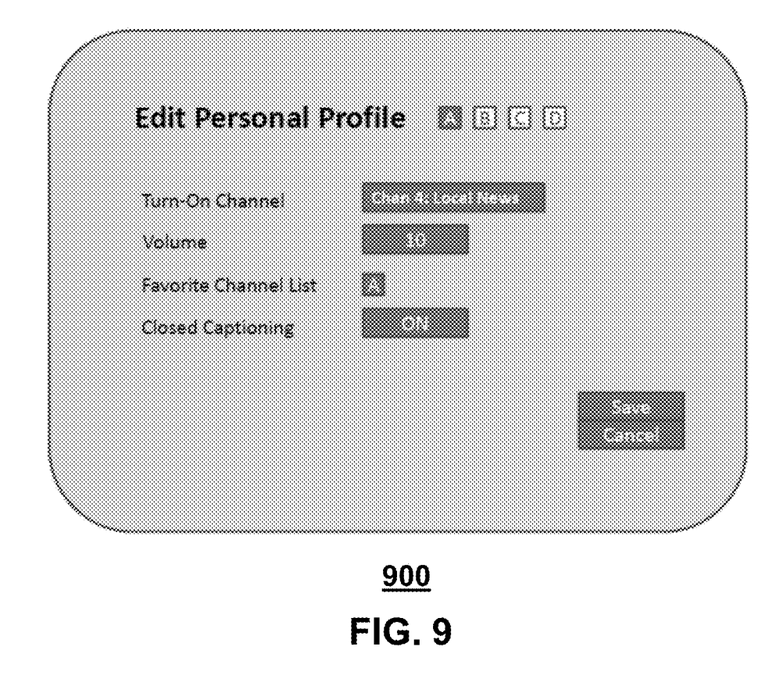

Referring now to FIG. 8, a graphical user interface 020 is illustrated. The graphical user interface can be used to edit startup preferences, including selecting a startup channel or media program that will be presented by the media processor device 506 automatically at the detection of a startup event or initiation of control. In one example, the graphical user interface 800 can be displayed at the media device 550 that is coupled to the media processor device 506. In another example, the graphical user interface can be accessed over an internet network at a website or a portal of the media server 530. Referring now to FIG. 9, another graphical user interface 900 is illustrated. In this interface 900, individual users (e.g., A, B, C, and D) can edit their user profiles. Each user can select a startup channel, startup volume level, a list of favorite channels, whether to enable or disable closed captioning.

Referring again to FIG. 6, in step 608, the media processor device 506 can detect a startup event. A startup event can be any event that results in the media processor device 506 initializing, resetting, or partially resetting. In one example, a startup event occurs when the media processor device 506 is plugged into a power source, when a button is selected on a media controller 507 to transition the media processor device 506 from OFF to ON, or when a reset button is pressed at the media processor device 506.

If the media processor device 506 detects the occurrence of a startup event, then the method can proceed to step 616. If the media processor device 506 does not detect a startup event in step 608, then, in step 612, the media processor device 512 can detect an initiation of control by a user. In one embodiment, the list of user profiles is accessed whenever a user initiates control of the media processor device 506, such as when a first user had been using a media controller device 507 to control a media processor device 506 but now a second user has now assumed control over the media controller device 507. In one embodiment, the media processor device 506 can detect that a new user has assumed control of a media controller device 507 by receiving a code from the media controller device 507 corresponding to the identity of the user. For example, the media controller device 507 can send a user identity code with each operational command sent to the media processor device 506. In another example, the media controller device 507 can send a user identity code only periodically, such as with every tenth command, or can send a user identity code only at startup or upon a change in identity of the user of the media controller device 507. Whenever a new user takes over control of the media controller device 507, the user code changes. In one embodiment, the media controller device 507 can receive a user selection of a button 524 indicating the identity of the current user of the media controller device 507.

In another embodiment, the media controller device 507 can automatically detect a user's identity by detecting, capturing, or monitoring a biometric input at the media controller device 507. For example, the media controller device 507 can automatically capture a fingerprint of a user by way of a fingerprint sensor integrated in the media controller device 507. A scan of the fingerprint could be transmitted to the media processor device 506 where the fingerprint could be compared with a database holding fingerprints of other users of the system 500. For example, the media controller device 507 can capture an image of the user's face that can be compared with facial images of the users of the system 500 at the media processor device 506. For example, the media controller device 507 can capture the voice of the user by way of a microphone device. The voice capture can be transmitted to the media processor device 506 for comparison with voice samples of the users of the system 500.

If the media processor device 506 does not detect the occurrence of a user initiation of control in step 612, then the media processor device 506 can continue monitoring for a startup event in step 608. However, if the media processor device 506 does detect the initiation of user control, then the method can proceed to step 616.

In step 616, the media processor device 506 can receive an input identifying a user of the system 500. In one example the media processor device 506 can receive a code from the media controller device 507 indicating an identity of the user of the media controller device 507. In another example, the media processor device 506 can deduce the user based on which media controller device 507 is used. In another embodiment, the media processor device 506 can determine the identity of the user, indirectly, by detecting a mobile device 116 of the user, such as a cellular phone or laptop computer. For example, the media processor device 506 can detect a mobile device 116 of the user by a Bluetooth or WiFi connection. In this example, the media processor device 506 can provide a user prompt at the media display device 550 to verify the identity of a user, especially where more than one mobile device has been detected in the vicinity of the media processor device 506.

In step 620, the media processor device 506 can access a list of user profiles. In one example, the list of user profile can be stored on the media processor device 506. In another example, the list of user profiles can be stored on the media server device 530. In yet another example, the user profiles can be stored in the media controller device 507.

In step 624, the media processor device 506 can determine if the identified user associated with the startup event or the initiation of control of the media processor device 506 matches one of the users in the list of user profiles. If the identified user does not match one of the user profiles, or if no user is identified with the startup event of the initiation of control of the media processor device 506, then the method can proceed to step 636, where a default startup channel and/or default startup media program can be determined. However, if the identified user matches one of the user profiles, then the method proceeds to step 628.

In step 628, the media processor device 506 can determine a startup channel or a media program from a startup preference from a user profile that has been matched to the identified user. For example, the user profile can instruct the media processor device 506 to tune in a particular channel anytime a first user powers up or initiates control of the media processor device 506. In another example, the user profile can instruct the media processor device 506 to select a particular media program anytime a second user powers up or initiates control of the media processor device 506. In another example, the user profile can include a default channel or a default media program for any power up or initiation of control. In another example, the user profile can include an alternative default channel or alternative default media program in the event that the default channel or default media program is unavailable at the moment when the user causes the startup event or initiation of control. In another embodiment, the user profile can include a list of channels and/or media programs where each is associated with a particular time or range of time during the day. The user profile can extend the time-based control to include days of the week or dates of the year. In one embodiment, the user profile can store, monitor for, and update a most recently watched channel and/or a most recently watched media program and can make one of these available to the media processor device 506 as the startup channel or media program.

In step 636, the media processor device 506 can determine a default startup channel and/or default startup media program. The default startup channel and/or media program can be preprogrammed into the media processor device 506 or can be entered by user. In step 640, the media processor device 506 can determine if the determined startup channel or startup media program is available from the media stream received from the media server device 530. For example, if the user profile provides a startup media program, the media processor device 506 can search an electronic programming guide to determine if this media program is available on the media stream from the media server device 530. If the media processor device 506 determines that the startup channel or media program is currently available, then the method continues at step 648. However, if the startup channel or media program are not available, then the method continues at step 644.

In one embodiment, the user profile can store a textual description of any startup channel and/or startup media program. The textual description of the startup channel and/or media program can be searched for keywords by the media processor device 506, in the event the startup channel or program is unavailable at the time of the startup event or initiation of control. The media processor 506 can use results of such a search to determine one or more alternative startup channels and/or media programs. For example, if the user profile specified tuning to CNN as the startup channel, but CNN was unavailable, then the media processor device 506 could search the written description of CNN and determine that it was a news channel. The media processor 506 could then determine that the FOX News channel could serve as an alternative channel. Similarly, if the startup media program reported from the user profile was for a program called "Cake Boss" that was not available at the time of startup, then the media processor device 506 could analyze the description for the show from metadata or other descriptive sources and determine that the show was a cooking reality show. The media processor device 506 could then determine that a cooking show from the Cooking Network could serve as a suitable alternative.

In step 648, the media processor device 506 can decode a media program corresponding to the startup channel or media program (or an alternative channel or media program) from the media stream provided by the media server device 530. In step 652, the media processor device 506 can present the decoded media program at the media device 550. In one embodiment, the media processor device 506 can present the media content at the media device 550 that is directly coupled to the media processor device 506. In another embodiment, the media processor device 506 can present the media content at a media device 550B that is coupled to a satellite media processor device 506B that is coupled to the media processor device 506.

In step 632, the media processor device 506 can determine an audio level or display setting to use for the startup channel or media program. In one example, the startup settings can be used to adjust the performance of the media device 550 to accommodate preferences of the user. For example, the startup settings can include audio settings, such as volume, muting, closed-captioning, and/or surround sound parameters. In another example, the startup setting can include display settings, such as an aspect ratio or enabling a high definition television signal.

In step 656, the media processor device 506 can monitor viewing habits for each user. For example, the media processor 506 can monitor viewing habits of the user to determine a most recently watched channel or media program or a most frequently watched channel or media program. In step 660, the media processor device 506 can update the user profile for each user based on the monitored channel and media program information. In one embodiment, the user profile can store a most recently watched channel and/or a most recently watched media program and can make one of these available to the media processor device 506 as the startup channel or media program. In one embodiment, the user profile can store a most frequently watched channel and/or a most frequently watched media program and can make one of these available to the media processor device 506 as the startup channel or media program.

Upon reviewing the aforementioned embodiments, it would be evident to an artisan with ordinary skill in the art that said embodiments can be modified, reduced, or enhanced without departing from the scope and spirit of the claims described below. For example, in one embodiment, the list of user profiles can be stored on the media server device 530. The media processor device 506 can access the list of user profiles from the server device 530 to determine the startup channel and/or media program. The media server device 530 can update and maintain the list of user profiles. In one embodiment, the media server device 530 can perform the method of determining the startup channel and/or media program. In one embodiment, the media controller device 507 can be a mobile device, such as a mobile phone, cellular phone, laptop computer, or pad-type device. The mobile device can execute an application to emulate the media controller device 507. In one embodiment, the media processor device 506 can share the list of user profiles with the slave media processor device 506B. Operation of the media controller device 507B for the slave media processor device 506B can be recognized and processed at the slave media processor device 506B or can be processed by the media processor 506 on behalf of the slave media processor device 506B.

In one embodiment, method 500 can be adapted in whole or in part to operate from the media controller device 507. In this embodiment, the media controller device 507 can identify the user, identify preferences of the user, and select an appropriate channel and/or media program (or alternatives thereof) according to the steps of method 500. In one embodiment, method 500 can be adapted in whole or in part to operate from the gateway 104 of FIG. 1 communicatively coupled to the media processor 106 and/or controller 107. In this embodiment, the gateway 104 can receive stimuli of the controller 107 supplied by the media processor 106 or supplied directly from the controller 107 to the gateway 104 by way of a wireless interface. The gateway 104 can tailor the content supplied by the media communication system 100 to adapt to the preferences of the user as defined by the user's profile, which can be continuously modified according to the user's monitored behavior.

Figure 10:
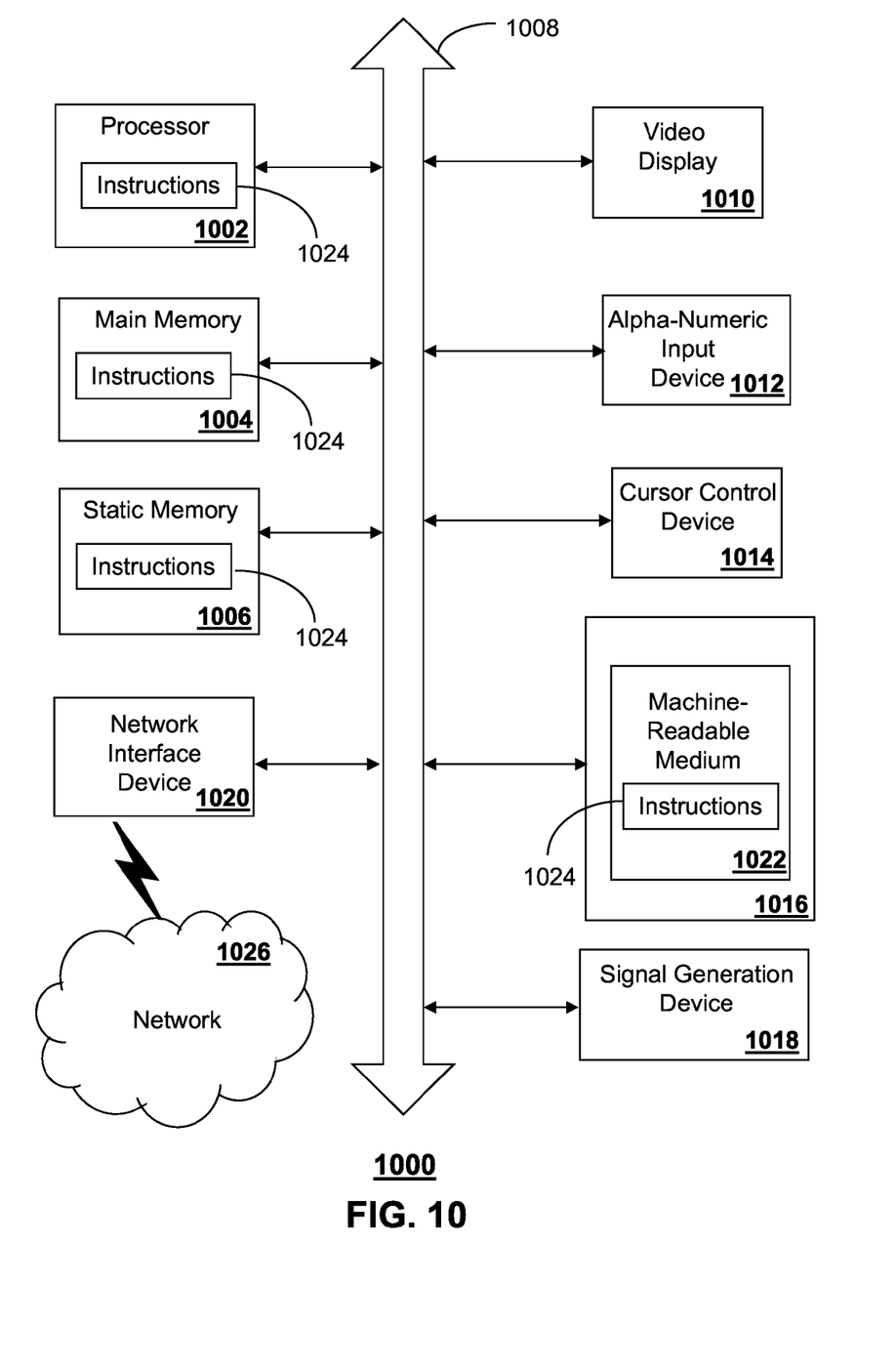
FIG. 10 is a diagrammatic representation of a machine in the form of a computer system within which a set of instructions, when executed, may cause the machine to perform any one or more of the methods discussed herein.

FIG. 10 depicts an exemplary diagrammatic representation of a machine in the form of a computer system 900 within which a set of instructions, when executed, may cause the machine to perform any one or more of the methods discussed above. One or more instances of the machine can operate, for example, as the media server device 130, the media processor 506, the gateway 104, the mobile communication device 116, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal displays (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor device, comprising:
a memory to store executable instructions; and
a processor coupled to the memory, wherein the processor, responsive to executing the executable instructions, performs operations comprising:
detecting a startup event;
receiving, at a user interface, an input identifying a first user from a plurality of user profiles associated with the media processor device responsive to detecting the startup event;
requesting, from a second media processor device, a first user profile associated with the first user from the plurality of user profiles;
receiving the first user profile from the second media processor device;
retrieving a startup program preference from the first user profile;
determining unavailability of a preferred startup program from the startup program preference;
accessing a keyword from a textual description associated with the startup program responsive to determining the unavailability of the startup program;
searching an electronic programming guide for an alternative startup program according to the keyword;
selecting an alternative startup channel associated with the alternative startup program according to a result of the searching;
decoding an alternative media program from a media stream corresponding to the alternative startup channel;
presenting the alternative media program at a media device;
monitoring programs selected by the first user of the media processor device;
detecting a change in behavior of the first user based on a monitoring of programs selected by the first user;
generating an updated startup program preference of the first user profile according to the detected change in the behavior of the first user;

detecting a new user based on another input identifying a new user of the media processor device;

creating a new user profile for the new user profile in the plurality of user profiles when the new user is detected;

creating a new startup program preference for the new user profile when the new user is detected;

updating the second media processor device with the new user profile when the new user is detected;

automatically switching from the new user to the first user based on an input identifying the first user controlling the media processor device, wherein the input includes periodically sending a user identity code at every predetermined number of commands, the predetermined number being more than one; and presenting to the first user an updated startup program according to the updated startup program preference of the first user profile previously determined from the change in the behavior of the first user.

2. The media processor device of claim 1, wherein the startup event comprises one of a powering up of the media processor device or an enabling of the media processor by a remote control device and wherein the processor further performs operations comprising determining the startup program according to a characteristic of the startup event.

3. The media processor device of claim 1, wherein the startup program comprises one of a default program, a program selected by the first user, or a program recently-watched by the first user.

4. The media processor device of claim 1, wherein the processor further performs operations comprising adjusting a display setting of the media device according to the startup program preference.

5. The media processor device of claim 1, wherein the startup program preference comprises a list of media programs associated with respective periods of time according to a time of day and a day of a week.

6. The media processor device of claim 1, wherein the processor further performs operations comprising:

monitoring programs selected by the plurality of users of the media processor device; and updating the startup program preference of a respective user profile of the plurality of user profiles according to the programs that are monitored.

7. The media processor device of claim 1, wherein the input identifying the first user comprises one of a code associated with an input selection at a remote control device, a code associated with the remote control device, a signal associated with a mobile device of the first user, or a biometric measurement captured at the remote control device.

8. The media processor device of claim 1, wherein the processor further performs operations comprising identifying the first user according to detecting a proximate presence of a radio frequency identification signal from a device associated with the first user.

9. A computer-readable storage device comprising executable instructions, which when executed by a processor at a media processor device, cause the processor to perform operations comprising:

receiving at a user interface an input indicating initiation of control by a first user from a plurality of user profiles associated with the media processor device;

comparing the first user to the plurality of user profiles associated with a plurality of users to identify a first user profile of the plurality of user profiles;

accessing the first user profile;

retrieving a startup media preference from the first user profile;

determining a startup program according to the startup media preference and a characteristic corresponding to the initiation of control by the first user;

determining an unavailability of the startup program;

accessing a determining the unavailability of the startup program;

searching an electronic programming guide for an alternative startup program according to a keyword associated with the startup program;

selecting an alternative startup channel associated with the alternative startup program according to a result of the searching;

decoding an alternative keyword from a textual description associated with the startup program responsive to an alternative media program from a media stream corresponding to the alternative startup program;

presenting the alternative media program from a media stream at a media device;

monitoring programs selected by the first user of the media processor device;

detecting a change in behavior of the first user based on a monitoring of programs selected by the first user;

updating the startup program preference of the first user profile according to the detected change in the programs that are monitored;

detecting a new user based on another input identifying a new user of the media processor device;

creating a new user profile for the new user profile in the plurality of user profiles when the new user is detected;

creating a new startup program preference for the new user profile when the new user is detected;

automatically switching from the new user to the first user based on an input identifying the first user controlling the media processor device, wherein the input includes periodically sending a user identity code at every predetermined number of commands, the predetermined number being more than one; and presenting to the first user an updated startup program according to the updated startup program preference of the first user profile previously determined from the change in the behavior of the first user.

10. The computer-readable storage device of claim 9, wherein the startup program comprises one of a default media program or a media program selected by the first user.

11. The computer-readable storage device of claim 9, wherein the startup program comprises a media program recently-watched by the first user.

12. The computer-readable storage device of claim 9, wherein the startup program comprise a media program most frequently watched by the first user.

13. The computer-readable storage device of claim 12, comprising executable instructions that cause the processor to further perform operations comprising:

monitoring media programming viewed by the new user; and updating the new user profile according to the media programming that is monitored.

14. The computer-readable storage device of claim 12, wherein the first user profile comprises most-viewed programs corresponding to days of week and times of day.

15. The computer-readable storage device of claim 9, wherein the input indicating initiation of control by the first user comprises one of a code associated with an input selection at a remote control device, a code associated with the remote control device, a signal associated with a proximity of the remote control device, or a biometric measurement captured at the remote control device.

16. A method, comprising:

identifying, by a system comprising a processor, a first user initiating control of a media processor device;

requesting from a second media processor device, by the system, a first user profile associated with the first user of a plurality of user profiles;

receiving, by the system, the first user profile from the second media processor device;

determining, by the system, a startup program according to the first user profile, wherein the startup program comprises one of a list of media programs associated with respective periods of time according to a time of day and a day of a week, a preferred media program, or a preferred media channel, wherein the list of media programs comprises choosing using a last watched channel, a specified channel, or selecting a channel showing a favorite show depending on specified times;

determining, by the system, unavailability of the startup program;

accessing, by the system, a keyword from a textual description associated with the startup program responsive to determining the unavailability of the startup program;

searching, by the system, an electronic programming guide for an alternative startup program according to the keyword;

selecting, by the system, an alternative startup channel associated with the alternative startup program according to a result of the searching;

decoding, by the system, an alternative media program from a media stream corresponding to the alternative startup channel;

transmitting, by the system, to a display device the alternate media program derived from a media stream;

monitoring programs selected by the first user of the media processor device;

detecting a change in behavior of the first user based on a monitoring of programs selected by the first user;

updating the startup program of the first user profile according to the detected change in the programs that are monitored;

detecting a new user based on another input identifying a new user of the media processor device;

creating a new user profile for the new user profile in the plurality of user profiles when the new user is detected;

creating a new startup program preference for the new user profile when the new user is detected;

updating the second media processor device with the new user profile when the new user is detected;

automatically switching from the new user to an other user from the plurality of user profiles based on an input identifying the other user has assumed control of the media processor device, wherein the input includes periodically sending a user identity code at every predetermined number of commands, the predetermined number being more than one; and updating the startup program based on the user profile of the other user.

17. The method of claim 16, comprising receiving, by the system, at a user interface of a media processor device a code transmitted from a remote control device, wherein the code corresponds to one of a user-specific input to the remote control device or an input to the remote control device where the remote control device is user-specific.

18. The method of claim 16, comprising receiving, by the system, at a user interface of a media processor device a code transmitted from a remote control device, wherein the code corresponds to one of an input of a user-specific biometric measurement at a remote control device or a detection of the remote control device by radio frequency identification.

19. The method of claim 16, wherein the startup program further comprises one of a default media program or a media program selected by the first user.

20. The method of claim 16, wherein the startup program further comprises one of a media program recently-watched by the first user or a media program most frequently watched by the first user.

\* \* \* \* \*